US008669492B2

(12) United States Patent
Ito et al.

(10) Patent No.: US 8,669,492 B2
(45) Date of Patent: Mar. 11, 2014

(54) PASSENGER SEAT DEVICE HAVING OCCUPANT DETECTOR EMBEDDED IN SEAT OF AUTOMOTIVE VEHICLE

(75) Inventors: Hiroyuki Ito, Chita (JP); Tsutomu Kamizono, Nagoya (JP); Shoichi Yamanaka, Anjo (JP)

(73) Assignee: Denso Corporation, Kariya (JP)

( * ) Notice: Subject to any disclaimer, the term of this patent is extended or adjusted under 35 U.S.C. 154(b) by 1672 days.

(21) Appl. No.: 11/825,837

(22) Filed: Jul. 9, 2007

(65) Prior Publication Data

US 2008/0017625 A1    Jan. 24, 2008

(30) Foreign Application Priority Data

Jul. 19, 2006  (JP) ................. 2006-196958

(51) Int. Cl.
B60L 1/02     (2006.01)
H05B 1/00     (2006.01)
H05B 3/00     (2006.01)
H05B 11/00    (2006.01)
H05B 1/02     (2006.01)

(52) U.S. Cl.
USPC ............................ 219/202; 219/217; 219/518

(58) Field of Classification Search
USPC ......... 219/202, 217, 506, 508, 509, 482, 518, 219/446.1, 447.1; 297/180.12, 217.3; 701/36
See application file for complete search history.

(56) References Cited

U.S. PATENT DOCUMENTS 5,176,424 A * 1/1993 Tobita et al. ............... 297/284.1
5,525,843 A   6/1996 Howing
5,696,409 A * 12/1997 Handman et al. ........... 307/10.1
5,890,779 A * 4/1999 Blackburn et al. .......... 307/10.1
5,894,207 A * 4/1999 Goings ....................... 318/478
6,179,378 B1 * 1/2001 Baumgartner et al. .. 297/180.12
6,283,504 B1   9/2001 Stanley et al.
6,290,255 B1   9/2001 Stanley et al.
6,348,862 B1   2/2002 McDonnell et al.

(Continued)

FOREIGN PATENT DOCUMENTS

| JP | 57-132218 | 8/1982 |
| JP | 11-63513 | 3/1999 |
| JP | 2002-270338 | 9/2002 |
| JP | 2002270338 A * 9/2002 | ............... H05B 3/00 |

OTHER PUBLICATIONS

Notification of Reason(s) for Refusal dated Sep. 24, 2010 in corresponding Japanese Application No. 2006-196958.

*Primary Examiner* — Henry Yuen
*Assistant Examiner* — Hemant Mathew
(74) *Attorney, Agent, or Firm* — Harness, Dickey & Pierce, PLC

(57) ABSTRACT

A passenger seat device includes a seat heater embedded in a seat and a detector electrode embedded underneath the seat heater. Electric power is supplied to the seat heater from an on-board battery through seat heater switches. Alternating voltage or current is supplied to the detector electrode. The detector electrode potential relative to the ground is lowered when the seat is occupied by a passenger. The changes in the potential of the detector electrode is detected by an occupant detector including a microcomputer. The detection is performed when the seat heater is brought to a floating state to suppress an amount of capacitance formed between the seat heater and the detector electrode. Thus, a sensitivity of the occupant detector is improved. The detector electrode may be eliminated, and the occupant conditions may be detected based on a potential of the seat heater to which alternating current or voltage is supplied.

9 Claims, 6 Drawing Sheets

(56) References Cited

U.S. PATENT DOCUMENTS

| | | |
|---|---|---|
| 6,378,900 B1 | 4/2002 | Stanley et al. |
| 6,392,542 B1 | 5/2002 | Stanley |
| 6,445,294 B1 | 9/2002 | McDonnell et al. |
| 6,517,106 B1 | 2/2003 | Stanley et al. |
| 6,520,535 B1 | 2/2003 | Stanley et al. |
| 6,563,231 B1 | 5/2003 | Stanley et al. |
| 6,577,023 B1 | 6/2003 | Stanley et al. |
| 6,598,900 B2 | 7/2003 | Stanley et al. |
| 6,703,845 B2 * | 3/2004 | Stanley et al. ............... 324/663 |
| 6,825,765 B2 | 11/2004 | Stanley et al. |
| 6,831,565 B2 | 12/2004 | Wanami et al. |
| 7,098,674 B2 | 8/2006 | Stanley et al. |
| 7,134,715 B1 * | 11/2006 | Fristedt et al. ........... 297/180.12 |
| 7,521,940 B2 * | 4/2009 | Koch et al. .................... 324/661 |
| 2005/0128082 A1 | 6/2005 | Stanley et al. |
| 2006/0164254 A1 | 7/2006 | Kamizono et al. |
| 2006/0196864 A1 * | 9/2006 | Horiyama et al. ............ 219/202 |

* cited by examiner

PASSENGER SEAT DEVICE HAVING OCCUPANT DETECTOR EMBEDDED IN SEAT OF AUTOMOTIVE VEHICLE

CROSS-REFERENCE TO RELATED APPLICATION

This application is based upon and claims benefit of priority of Japanese Patent Application No. 2006-196958 filed on Jul. 19, 2006, the content of which is incorporated herein by reference.

BACKGROUND OF THE INVENTION

1. Field of the Invention

The present invention relates to a passenger seat device of an automotive vehicle, the passenger seat device including a detector for detecting an occupant occupying a seat.

2. Description of Related Art

JP-A-2003-80989 proposes a passenger seat having a detector for detecting an occupant on the seat based on changes in an alternating electric field on and around the seat. This type of the occupant detector is referred to as a capacitance-type occupant detector. The occupant detector includes a first electrode embedded in the seat for forming an alternating electric field and a second electrode embedded in a seatback for detecting changes in the electric field caused by an occupant seating on the seat. An impedance between the first and the second electrode becomes lower when a seat is occupied by a passenger because the passenger body is a dielectric member and a conductive member as well.

JP-A-2003-80989 also proposes to embed a seat heater heated by electric power underneath the detector electrode. A parasitic capacitor is formed between the detector electrode and the seat heater that is substantially at a constant potential. This parasitic capacitor gives an influence on an electric potential of the detector electrode. Sensitivity of the occupant detector is lowered when the large parasitic capacitor is equivalently coupled to the detector electrode. In addition, there is a problem that a heat resistance between a passenger on the seat and the seat heater is large because the seat heater is embedded at a lower portion of the seat to reduce an amount of the parasitic capacitor formed between the detector electrode and the seat heater.

SUMMARY OF THE INVENTION

The present invention has been made in view of the above-mentioned problems, and an object of the present invention is to provide an improved passenger seat device including an occupant detector that has a high sensitivity.

The passenger seat device according to the present invention includes a seat heater embedded in a seat in parallel to a seat surface. Electric power is supplied to the seat heater from an on-board power source such as a battery through seat heater switches. A detector electrode is embedded underneath the seat heater, and alternating current or voltage is supplied to the detector electrode from an alternating current power source having a predetermined frequency. An occupant detector is connected to the detector electrode to detect occupancy conditions of the seat based on changes in an electric potential of the detector electrode relative to the ground.

An impedance between the detector electrode and the ground is reduced when the seat is occupied by a passenger, and thereby the potential of the detector electrode relative to the ground is lowered. The occupant detector detects the potential of the detector electrode when the seat heater is brought to a floating potential by opening the heater switches. In this manner, a parasitic capacitance formed between the seat heater and the detector electrode is suppressed, and thereby detection sensitivity of the occupant detector is improved. The occupant conditions of the seat may include whether the seat is occupied or not, whether the seat is occupied by an adult or a child, and whether the seat is occupied by a child seat or the like.

The detector electrode may be eliminated, and the occupancy conditions may be detected based on the potential of the seat heater. The alternating current or voltage is supplied to the seat heater from the alternating current power source. The seat heater is brought to a floating condition by opening the seat heater switches when the occupancy conditions are detected by the occupant detector. The alternating current power source may supply a pulse voltage including a predetermined frequency component to the seat heater. The seat heater may be connected to the occupant detector through a coupling capacitor, a diode, or a switch that is closed when the heater switches are opened.

According to the present invention, the occupancy conditions are detected with a high accuracy and a high sensitivity. Other objects and features of the present invention will become more readily apparent from a better understanding of the preferred embodiments described below with reference to the following drawings.

DETAILED DESCRIPTION OF THE PREFERRED EMBODIMENTS

Figure 1:
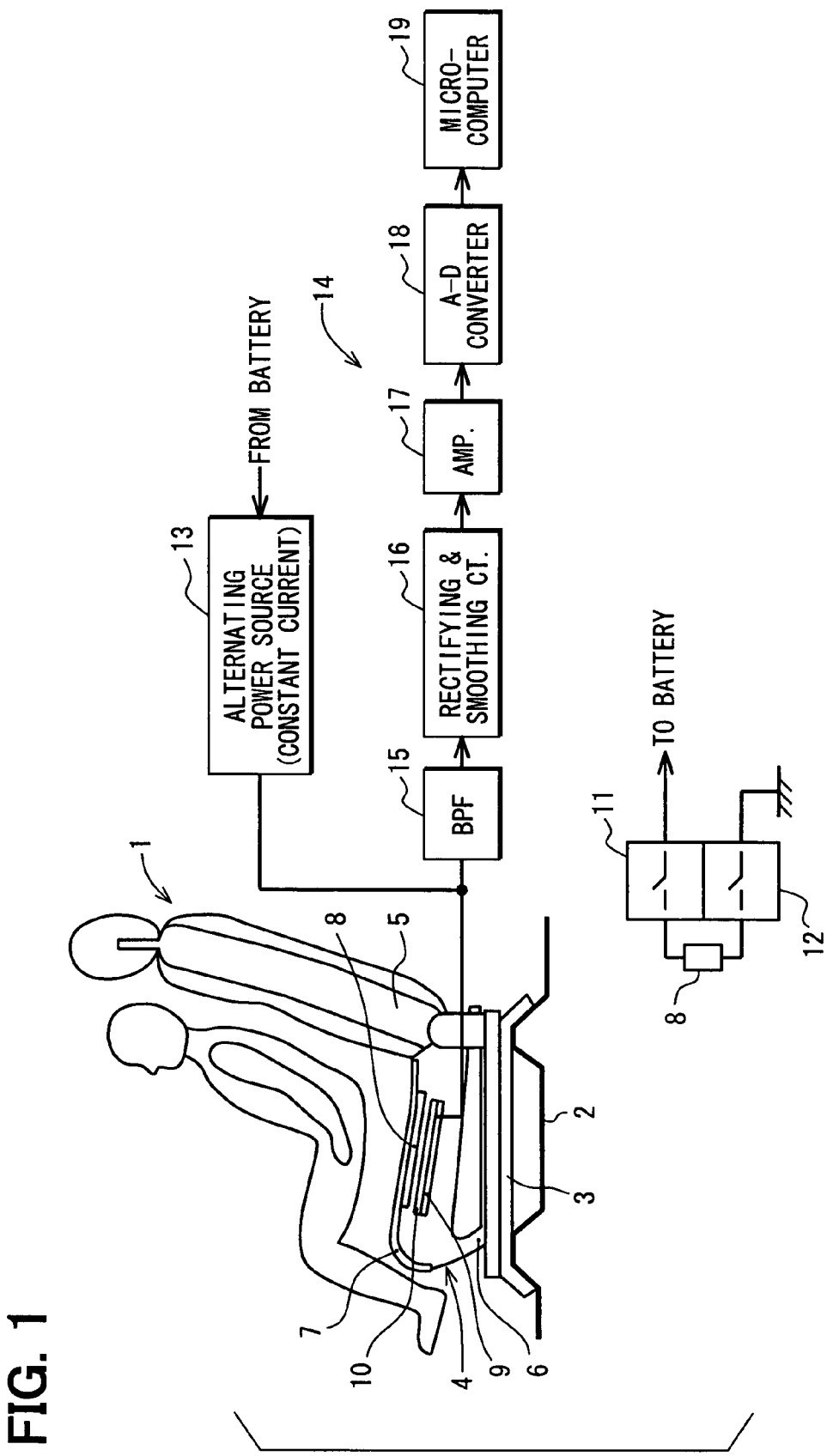
FIG. 1 is a schematic view showing a seat device having an occupant detector as a first embodiment of the present invention.

A first embodiment of the present invention will be described with reference to FIG. 1. A seat device 1 includes a seat 4 on which a passenger sits, a seat-back 5 which supports a passenger's back, an occupant detector 14 including various components. The seat 1 is positioned on a floor 2 of an automotive vehicle, supported by a metallic frame 3.

The seat 4 includes: a cushion pad 6 fixed to the metallic frame 3; a cushion cover 7 covering a seat surface of the seat 4; a seat heater 8 embedded in the cushion pad 6 in substantially parallel to the seat surface; a detector electrode 9 for detecting an occupant on the seat embedded under the seat heater 8 in parallel thereto; and a waterproof film (or an insulating film) 10 disposed between the detector electrode 9 and the seat heater 8. The cushion pad 6 is made of a material such as hard form-urethane, and the cushion cover 7 is made of a material such as woven fibers having a good ornamental effect.

The seat heater 8 is made of a plane resistor member or wire resistor members, which are not necessarily covered with insulating films. The seat heater 8 may be embedded also in the seat back 5. One end (a high potential end) of the seat heater 8 is connected to a plus terminal of an on-board battery (not shown) through a seat heater switch 11, and the other end (a low potential end) of the seat heater 8 is connected to a ground terminal (a minus terminal) of the battery through another seat heater switch 12, as shown in FIG. 1. An additional switch may be disposed between the plus terminal of the battery and the seat heater switch 11, and another additional switch may be disposed between the ground terminal of the battery and the seat heater switch 12. In place of the on-board battery, an alternating current source such as an alternator driven by an engine may be used as a power source for supplying heating power to the seat heater 8.

The detector electrode 9 is formed by a plane conductor plate, plural wires or net-shaped wires. An alternating current power source 13 powered by the battery supplies a constant alternating current in this particular embodiment. By supplying the alternating current to the detector electrode 9, an impedance between the detector electrode 9 and the ground varies according to whether the seat is occupied or not. This causes a change in an electric potential of the detector electrode 9 relative to the ground. Since the impedance decreases when the seat is occupied, the potential of the detector electrode 9 is lowered, which is detected by the occupant detector 14.

The occupant detector 14 includes a band pass filter 15, a rectifying and smoothing circuit 16, an amplifier 17, an A-D converter 18 and a microcomputer 19. The band pass filter 15 allows a predetermined frequency contained in the power source 13 to pass through. The band pass filter 15 may be composed of an resonant filter. The alternating current component passing through the band pass filter 15 is rectified and smoothed by the rectifying and smoothing circuit 16, and amplified by the amplifier 17. Then, the amplified analog output is converted into a digital signal by the A-D converter 18, and then the digital signal is fed to the microcomputer 19. The microcomputer 19 determines that the seat is occupied if the digital signal becomes lower than a predetermined level. It is also possible to design the microcomputer 19 to determine whether the occupant is an adult or a child, or whether a child seat or the like is positioned on the seat or not. These conditions are referred to as "occupancy conditions."

An important feature of the first embodiment resides in that the seat heater 8 is disconnected from the battery and the ground at a predetermined interval of $\Delta T$ for a predetermined period of $\Delta T$-off to bring the seat heater 8 to a floating potential, and the computer 19 determines the occupancy conditions in the period in which the seat heater 8 is at a floating potential. For example, the predetermined interval $\Delta T$ is set to 500 milliseconds, and the predetermined off-period $\Delta T$-off is set to 20 milliseconds. It is preferable, however, to determine the occupancy conditions at a time as late as possible in the off-period $\Delta T$-off to avoid any influence caused by operation of the heater switches 11, 12 for disconnecting the seat heater 8.

By disconnecting the seat heater 8, the seat heater 8 becomes a floating potential, and a capacitance between the detector electrode 9 and the seat heater 8 is considerably reduced, and sensitivity of the occupant detector is much improved. The seat heater switches 11, 12 are also utilized as switches for supplying heating power to the seat heater 8 from the on-board battery. When it is not necessary to heat the seat, it is preferable to open the heater switches 11, 12 and to bring the seat heater 8 to the floating potential.

Figure 2:
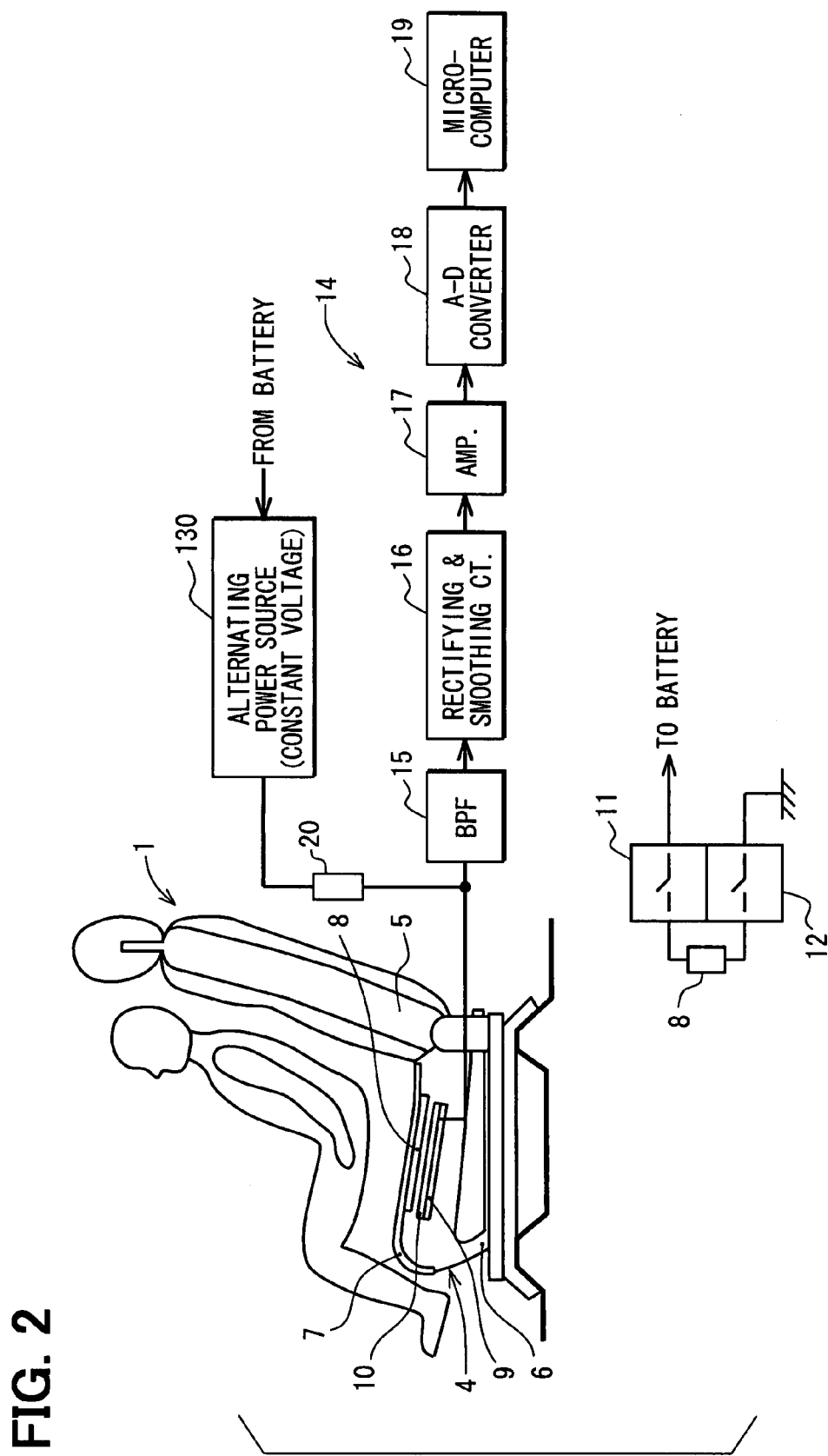
FIG. 2 is a schematic view showing a seat device having an occupant detector as a modified form of the first embodiment.

A modified form of the first embodiment will be described with reference to FIG. 2. In this modified form, the alternating power source 13 supplying a constant current is replaced with an alternating power source 130 supplying a constant alternating voltage. The constant alternating voltage is supplied to the detector electrode 9 through an output resistor 20. Accordingly, the potential Pd of the detector electrode 9 becomes a potential obtained by multiplying the alternating voltage Vout outputted from the power source 130 with a ratio of an impedance Zd of the detector electrode 9 relative to the ground and a sum of the output resistor R and the impedance Zd. That is, Pd=Vout×Zd/(Zd+R). Other structures and functions of this modified form are the same as those of the first embodiment.

Figure 3:
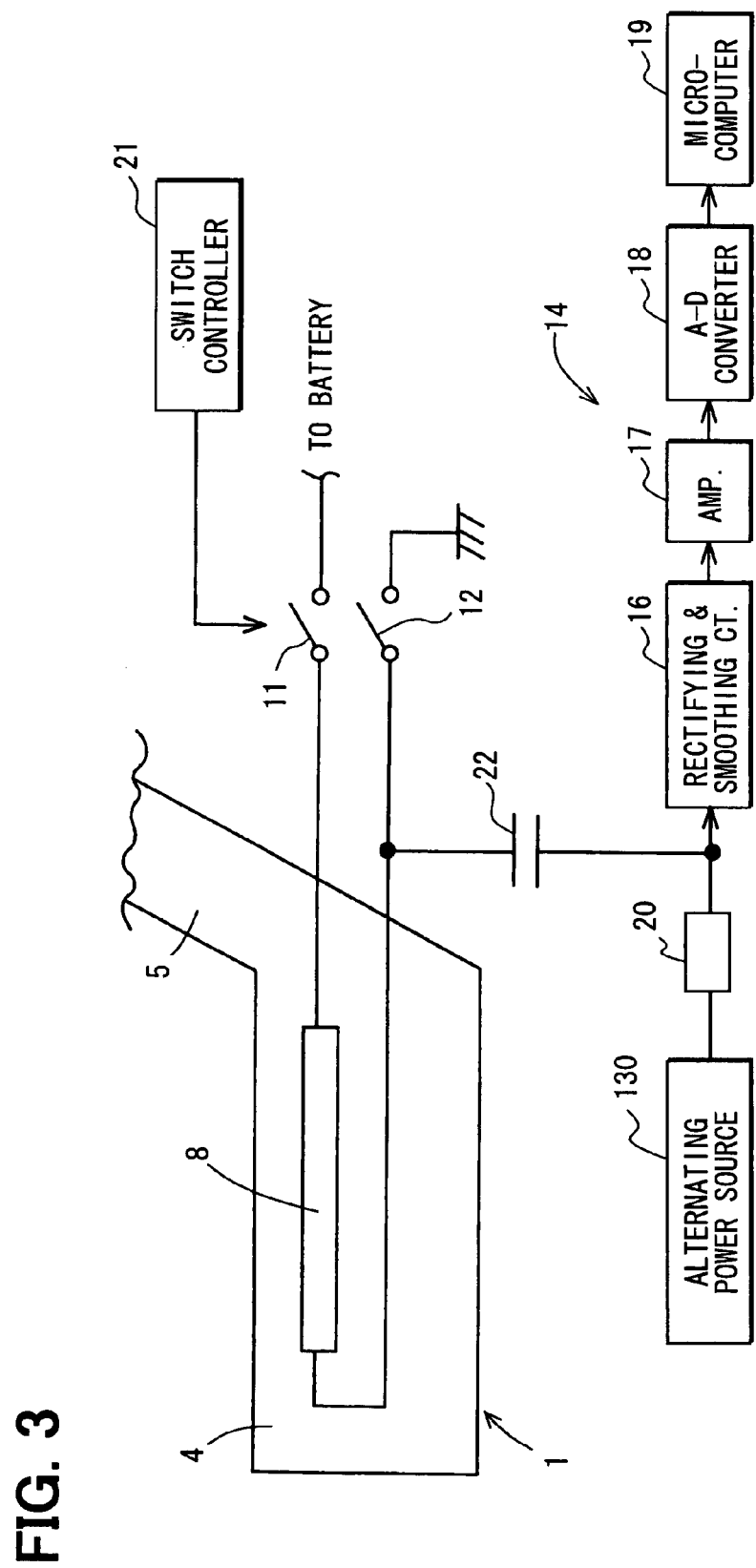
FIG. 3 is a block diagram showing electrical connections in a seat device having an occupant detector as a second embodiment of the present invention.

A second embodiment of the present invention will be described with reference to FIG. 3. In this embodiment, the detector electrode 9 used in the foregoing embodiments is eliminated, and the occupancy conditions are detected based on a potential of a low potential end (an end connected to the ground through the heater switch 12) of the seat heater 8 when the heater switches 11, 12 are opened. The low potential end of the seat heater 8 is connected to the occupant detector 14 through a coupling capacitor 22, and the alternating power source 130 (a constant voltage source) is connected to the occupant detector 14 through the output resistor 20. The alternating power source 130 and the output resistor 20 may be replaced with the alternating power source 13 (a constant current source) as in the first embodiment. A switch controller 21 controls operation of the seat heater switches 11, 12. That is, the seat heater switches 11, 12 are opened in synchronism with a sampling timing of the digital data by the microcomputer 19. Other structures are the same as those in the first embodiment.

In the second embodiment, the occupancy conditions are detected with a high sensitivity since the data for determining the occupancy conditions are sampled when the seat heater 8 is brought to the floating state. The alternating voltage may be supplied from the alternating power source 130 to the seat heater 8 and the occupant detector 14 only when the data are sampled by the microcomputer 19. The coupling capacitor 22 interrupts influence of the battery voltage on the alternating power source 130 and the occupant detector 14.

Figure 4:
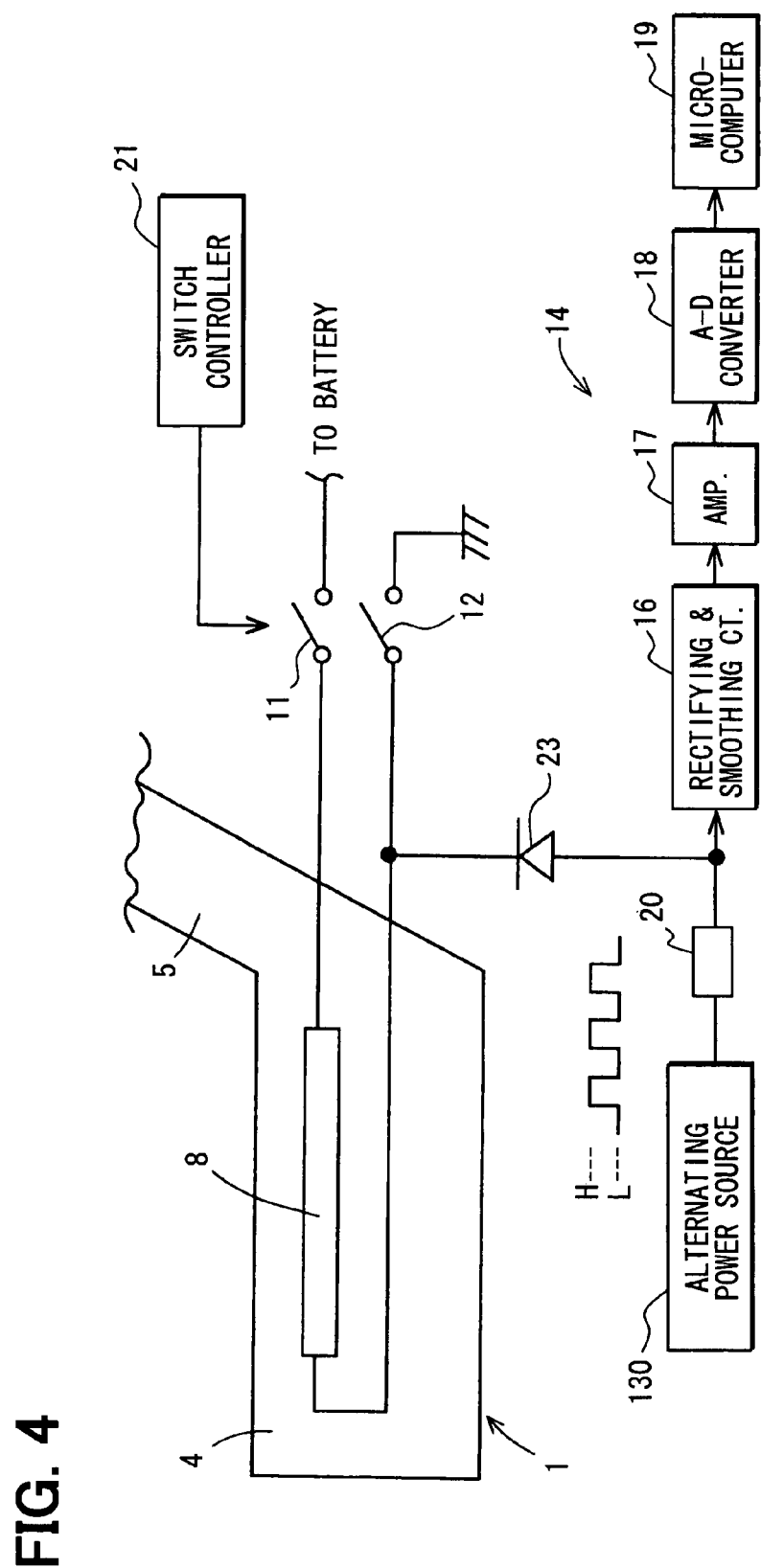
FIG. 4 is a block diagram showing electrical connections in a seat device having an occupant detector as a modified form (1) of the second embodiment of the present invention.

A modified form (1) of the second embodiment is shown in FIG. 4. In this modified form (1), the coupling capacitor 22 used in the second embodiment is replaced with a diode 23 that prevents influence of the seat heater 8 to the alternating power source 130 and the occupant detector 14. The alternating power source 130 outputs a pulse voltage (i.e., an alternating voltage to which a direct voltage is superimposed) in this modified form (1). Alternating frequency components included in the pulse voltage are in a range of several tens kHz to several MHz, and preferably, several hundreds kHz.

Figure 5:
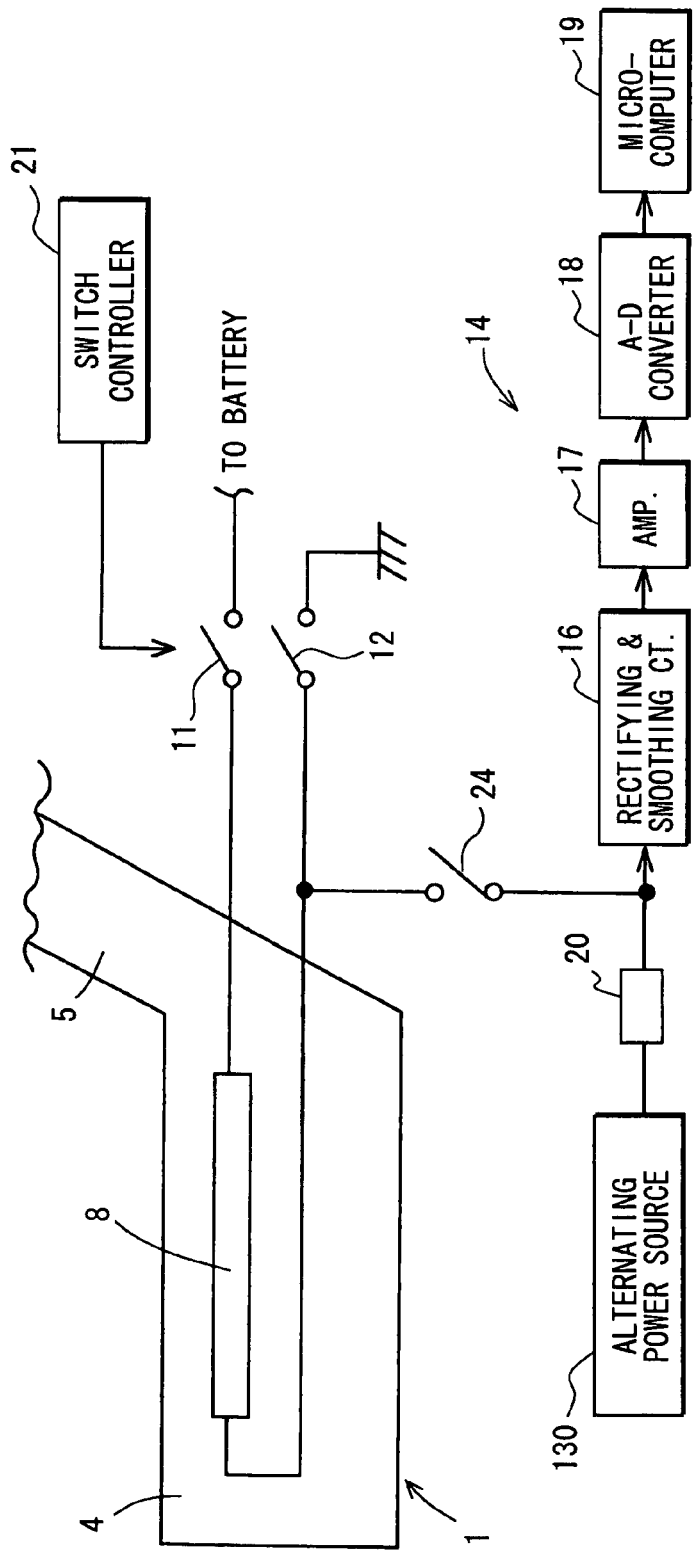
FIG. 5 is a block diagram showing electrical connections in a seat device having an occupant detector as a modified form (2) of the second embodiment of the present invention.

A modified form (2) of the second embodiment is shown in FIG. 5. In this modified form (2), the coupling capacitor 22 used in the second embodiment is replaced with an analog switch 24. The alternating power source 130 outputs a pulse voltage as in the modified form (1). Other structures are the same as those in the second embodiment. The analog switch 24 is closed when the heater switches 11, 12 are opened.

Figure 6:
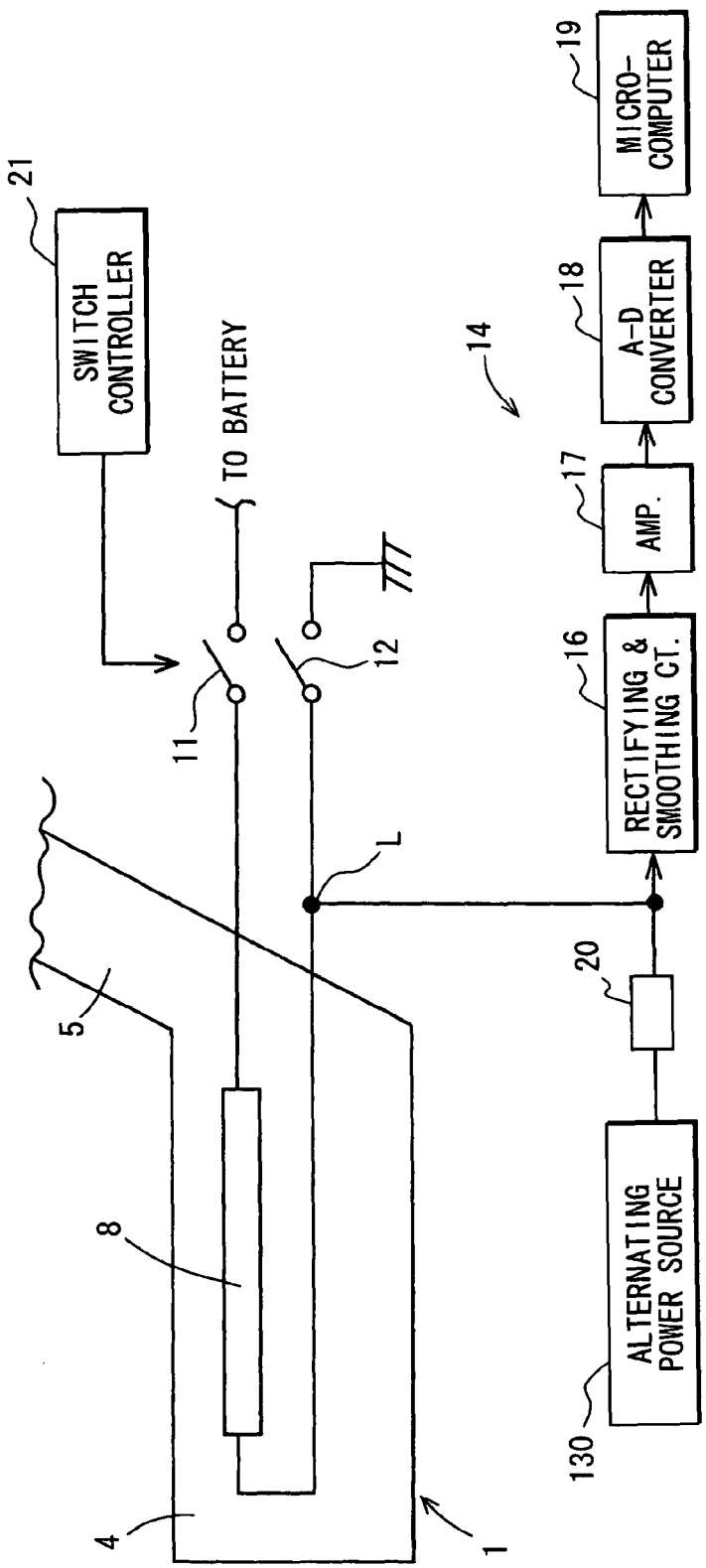
FIG. 6 is a block diagram showing electrical connections in a seat device having an occupant detector as a modified form (3) of the second embodiment of the present invention.

A modified form (3) of the second embodiment is shown in FIG. 6. In this embodiment, the low potential end L (the end connected to the ground through the heater switch 12) of the seat heater 8 is directly connected to the occupant detector 14, and the alternating power source 130 is connected to the low potential end L through the output resistor 20. During a period in which the seat heater 8 is heated by the battery by closing the heater switches 11, 12, a potential of the low potential end L of the seat heater 8 substantially becomes the ground potential, and the alternating power outputted from the alternating power source 130 is grounded through the output resistor 20 and dissipated in the output resistor 20. In this period, a ground potential is inputted to the occupant detector 14. When the heater switches 11, 12 are opened, the seat heater 8 is brought to the floating potential which is fed to the occupant detector 14. Thus, the seat heater 8 functions as the detector electrode. To save power consumption, the alternating power source 130 may be turned off while the heater switches 11, 12 are closed.

The present invention is not limited to the embodiments and modified forms described above, but it may be variously modified. For example, though a single electrode is used as the detector electrode 9 in the first embodiment, the detector electrode 9 may be composed of a pair of electrodes having an insulating film interposed therebetween. While the present invention has been shown and described with reference to the foregoing preferred embodiments and modified forms, it will be apparent to those skilled in the art that changes in form and detail may be made therein without departing from the scope of the invention as defined in the appended claims.

What is claimed is:

1. A passenger seat device for an automotive vehicle, comprising:
   a seat heater embedded at least in a seat in parallel to a seat surface, wherein an electric current is supplied to the seat heater in a controlled manner from an on-board power source of the automotive vehicle;
   a first seat heater switch that is interposed between a first end of the seat heater and the on-board power source;
   a second seat heater switch that is interposed between a second end of the seat heater and a ground;
   a detector electrode embedded in the seat;
   an alternating current power source which is provided integrally with or separate from the on-board power source and which supplies an alternating voltage having a predetermined frequency to the detector electrode;
   a detector for detecting occupancy conditions of the seat based on changes in an electric potential of the detector electrode, wherein:
   the first and second ends of the seat heater are disconnected from the on-board power source and the ground, respectively, for a predetermined time value by opening the first and second seat heater switches to bring the seat heater to a floating state; and
   the detector detects the occupancy conditions of the seat during a period in which the seat heater is in the floating state.

2. The passenger seat device as in claim 1, wherein the first seat heater switch is a single dedicated seat heater switch which is provided between the seat heater and the on-board power source to turn on or off only the seat heater in a controlled manner.

3. The passenger seat device as in claim 1, wherein the seat heater is embedded in the seat at a position closer to the seat surface than the detector electrode.

4. The passenger seat device as in claim 1, further including an insulating film disposed between the seat heater and the detector electrode.

5. A passenger seat device for a vehicle, comprising:
   a seat heater embedded at least in a seat in parallel to a seat surface, wherein an electric current is supplied to the seat heater from an on-board power source of the vehicle;
   at least one seat heater switch simultaneously opening and closing both of a first electrical connection, which connects a first end of the seat heater to the on-board power source, and a second electrical connection, which connects a second end of the seat heater to a ground;
   a detector electrode embedded in the seat; and
   a detector that detects an occupancy condition of the seat based on a change in an electric potential of the detector electrode upon application of an electric current to the detector electrode, wherein the detector detects the occupancy condition of the seat only when both of the first and second electrical connections are opened by the at least one seat heater switch to disconnect the seat heater from both the on-board power source and the ground.

6. The passenger seat device as in claim 5, wherein the at least one seat heater switch includes:
   a first seat heater switch that is interposed between the first end of the seat heater and the on-board power source; and
   a second seat heater switch that is interposed between the second end of the seat heater and the ground.

7. The passenger seat device as in claim 5, wherein the at least one seat heater switch is repeatedly switched off and on to simultaneously open and close both of the first and second electrical connections.

8. A passenger seat device for an automobile, the passenger seat device comprising:
   a seat heater embedded in a seat, an electric current being supplied to the seat heater from a first power source of the automotive vehicle;
   a detector electrode embedded in the seat;
   a second power source which is provided integrally with or separate from the first power source, the second power source supplying an alternating voltage to the detector electrode;
   a detector for detecting occupancy conditions of the seat based on changes in an electric potential of the detector electrode; wherein
   the seat heater is continuously disconnected from the first power source for a predetermined amount of time at predetermined intervals by opening seat heater switches to bring the seat heater to a floating state; and
   the detector detects the occupancy conditions of the seat during a period in which the seat heater is in the floating state.

9. The passenger seat device as in claim 8, wherein the detector detects the occupancy conditions of the seat only during the period in which the seat heater is in the floating state.

* * * * *